United States Patent [19]

Tallman et al.

[11] Patent Number: 4,515,145
[45] Date of Patent: May 7, 1985

[54] GAS-FIRED CONDENSING MODE FURNACE

[75] Inventors: William R. Tallman, Huntington; Steven C. McDevitt, Fort Wayne, both of Ind.; Warren H. Delancey, Elyria, Ohio

[73] Assignee: Yukon Energy Corporation, Minneapolis, Minn.

[21] Appl. No.: 538,582

[22] Filed: Oct. 3, 1983

[51] Int. Cl.³ .............................................. F24H 3/08
[52] U.S. Cl. .................................. 126/99 A; 126/109; 126/110 R; 126/112
[58] Field of Search ............... 126/99 R, 99 A, 99 C, 126/110 R, 110 D, 117, 109, 112, 116 R, 116 A, 116 B; 431/1

[56] References Cited

U.S. PATENT DOCUMENTS

| | | | |
|---|---|---|---|
| 1,416,916 | 5/1922 | Walker | 126/277 |
| 1,546,592 | 7/1925 | Lawrence . | |
| 1,621,881 | 3/1927 | Harrison . | |
| 2,013,237 | 9/1935 | Funk | 126/116 |
| 2,247,849 | 7/1941 | Ritter | 126/116 |
| 2,504,315 | 4/1950 | Feuerfile | 126/110 |
| 2,592,396 | 4/1952 | Dahlstrom | 126/116 |
| 2,603,208 | 7/1952 | Beauchamp | 126/116 |
| 2,715,399 | 8/1955 | Witt et al. | 126/110 |
| 2,751,900 | 6/1956 | Modine | 126/110 |
| 2,916,032 | 12/1959 | Kitchen | 126/116 |
| 3,267,985 | 8/1966 | Kitchen | 431/1 |
| 3,294,082 | 12/1966 | Norris | 126/116 |
| 3,358,672 | 12/1967 | Dirk et al. | 126/110 |
| 3,504,661 | 4/1970 | Morris et al. | 126/116 |
| 3,661,140 | 5/1972 | Raleigh | 126/110 |
| 3,667,451 | 6/1972 | Boucher | 126/110 |
| 3,670,713 | 6/1972 | Abbott | 126/110 |
| 3,726,267 | 4/1973 | Cavestany et al. | 126/85 |
| 3,807,382 | 4/1974 | Kennedy | 126/116 |
| 3,926,173 | 12/1975 | Jury | 126/110 |
| 3,944,136 | 3/1976 | Huie | 126/110 |
| 4,006,728 | 2/1977 | Nishi et al. | 126/110 |
| 4,106,474 | 8/1978 | Hunter et al. | 126/10 |
| 4,160,440 | 7/1979 | Barnickle | 126/110 |
| 4,164,210 | 8/1979 | Hollowell | 126/110 |
| 4,175,518 | 11/1979 | Reames, Jr. | 122/20 |
| 4,194,488 | 3/1980 | Bellaff | 126/112 |
| 4,241,723 | 12/1980 | Kitchen | 431/1 |
| 4,241,874 | 12/1980 | Schossow | 126/117 |
| 4,271,789 | 6/1981 | Black | 122/16 |
| 4,275,705 | 6/1981 | Schaus et al. | 126/110 |
| 4,289,730 | 9/1981 | Tomlinson | 422/178 |
| 4,351,276 | 9/1982 | Kremer | 237/55 |

*Primary Examiner*—Daniel J. O'Connor
*Attorney, Agent, or Firm*—Peterson, Palmatier, Sturm, Sjoquist & Baker, Ltd.

[57] ABSTRACT

A gas-fired, condensing mode, hot air furnace has an exhaust passage for carrying the products of combustion from a gas burner to an exhaust flue. A heat exchanger is provided in the exhaust passage for extracting heat from the products of combustion. An air passage is provided for carrying a flow of air over the heat exchanger and a blower causes a flow of air through the air passage. The gas burner is enclosed and fires into the heat exchanger. A fresh air duct communicates with the burner enclosure for admitting fresh air thereto. A condenser is provided in the exhaust passage for removing water from the products of combustion, the condenser being exposed to the air passage. A second blower is provided in the exhaust passage for causing fluid flow therein from the fresh air inlet duct through the enclosure and the exhaust passage to the exhaust flue.

20 Claims, 11 Drawing Figures

GAS-FIRED CONDENSING MODE FURNACE

BACKGROUND OF THE INVENTION

1. Field of the Invention

This invention relates generally to gas-fired hot air furnaces, and more particularly to a condensing mode furnace of that type.

2. Description of the Prior Art

Atmospheric-type, gas fired hot air furnaces conventionally comprise a gas burner in the form of a gas jet firing into a combustion chamber, combustion air being supplied at atmospheric pressure; a heat exchanger for extracting heat from the products of combustion of the burner; an exhaust passage for carrying the products of combustion from the heat exchanger to an exhaust flue; an air passage for carrying a flow of air over the heat exchanger to a hot air outlet thereby to extract heat from the heat exchanger; and a blower for causing a flow of air through the air passage.

Condensing mode furnaces are known which include a condenser for condensing water out of the products of combustion to reduce the stack temperature and thereby increase the efficiency of the furnace.

Conventional atmospheric-type, gas-fired hot air furnace systems typically include a thermostat for sensing the temperature in the space to be heated, and a furnace control including a fan and limit switch. Closing of the thermostat contacts causes opening of a solenoid-operated gas valve, ignition of the gas being provided by a pilot or spark ignition, followed by initiation of operation of the blower by the fan switch. Opening of the thermostat contacts causes closing of the gas valve and the fan switch thereafter terminates operation of the blower.

SUMMARY OF THE INVENTION

The invention, in its broader aspects, is embodied in a hot air furnace including gas burner means, exhaust passage means for carrying the products of combustion from the burner means to an exhaust flue, heat exchanger means in the exhaust passage means for extracting heat from the products of combustion, air passage means for carrying a flow of air over the heat exchanger means to be heated thereby, and air moving means for causing a flow of air through the air passage means. In accordance with the invention, means is provided communicating with the exhaust passage means for enclosing the burner means, the burner means firing into the exhaust passage means, and a fresh air duct communicates with the enclosing means for admitting combustion air thereto. Condenser means is provided in the exhaust passage means for removing water from the products of combustion, the condenser means being exposed to the air passage means. Second air moving means is provided in the exhaust passage means for causing fluid flow therein from the fresh air inlet duct through the enclosing means and the exhaust passage means to the exhaust flue.

In the preferred embodiment of the invention, the condenser means is a fin and tube-type condenser serially coupled between the heat exchanger and an exhaust vent having the second air moving means in the form of a blower therein.

It is accordingly an object of the invention to provide an improved gas-fired hot air furnace.

Another object of the invention is to provide an improved gas-fired hot air furnace including a condenser for removing water from the products of combustion.

Yet another object of the invention is to provide an improved gas-fired hot air furnace including a sealed enclosure for the gas burner adapted to be connected to a fresh air duct.

The above-mentioned and other features and objects of this invention and the manner of attaining them will become more apparent and the invention itself will be best understood by reference to the following description of embodiments of the invention taken in conjunction with the accompanying drawings.

BRIEF DESCRIPTION OF THE PREFERRED EMBODIMENT

Referring now to FIGS. 1 through 10 of the drawings, there is shown the improved gas-fired, condensing mode hot air furnace of the invention, generally indicated at 12. Furnace 12 has enclosure or casing 14 formed by top and bottom walls 16, 18, side walls 20, 22, rear wall 24, and removable front wall or access door 26. In the illustrated embodiment, rear wall 24 has cold air inlet opening 28 therein with cold air inlet duct 30 connected thereto, and top wall 16 has hot air discharge opening 32 therein with hot air discharge duct 34 connected thereto.

Casing 14 has horizontal partition 36 therein extending between side walls 20, 22 and back and front walls 24, 26 in spaced, parallel relationship with the top and bottom walls 16, 18. Casing 14 also has vertical partition 38 therein extending between side walls 20, 22, and between top wall 16 and partition 36. Partition 36, side walls 20, 22, rear and front walls 24, 26, and bottom wall 18 define lower cavity 40 for accommodating furnace blower 42 having its air discharge 44 communicating with opening 46 in partition 36. Partition 38, side walls 20, 22, top wall 16, partition 36, and front wall 26 define burner cavity 48. Partition 38, side walls 20, 22, top wall 16, partition 36 and rear wall 24 define air passage 50 extending between air discharge 44 of blower 42 and hot air discharge duct 34. Partition 38 has interior side 52 exposed to air passage 50 and exterior side 54 exposed to burner cavity 48.

Figure 1:
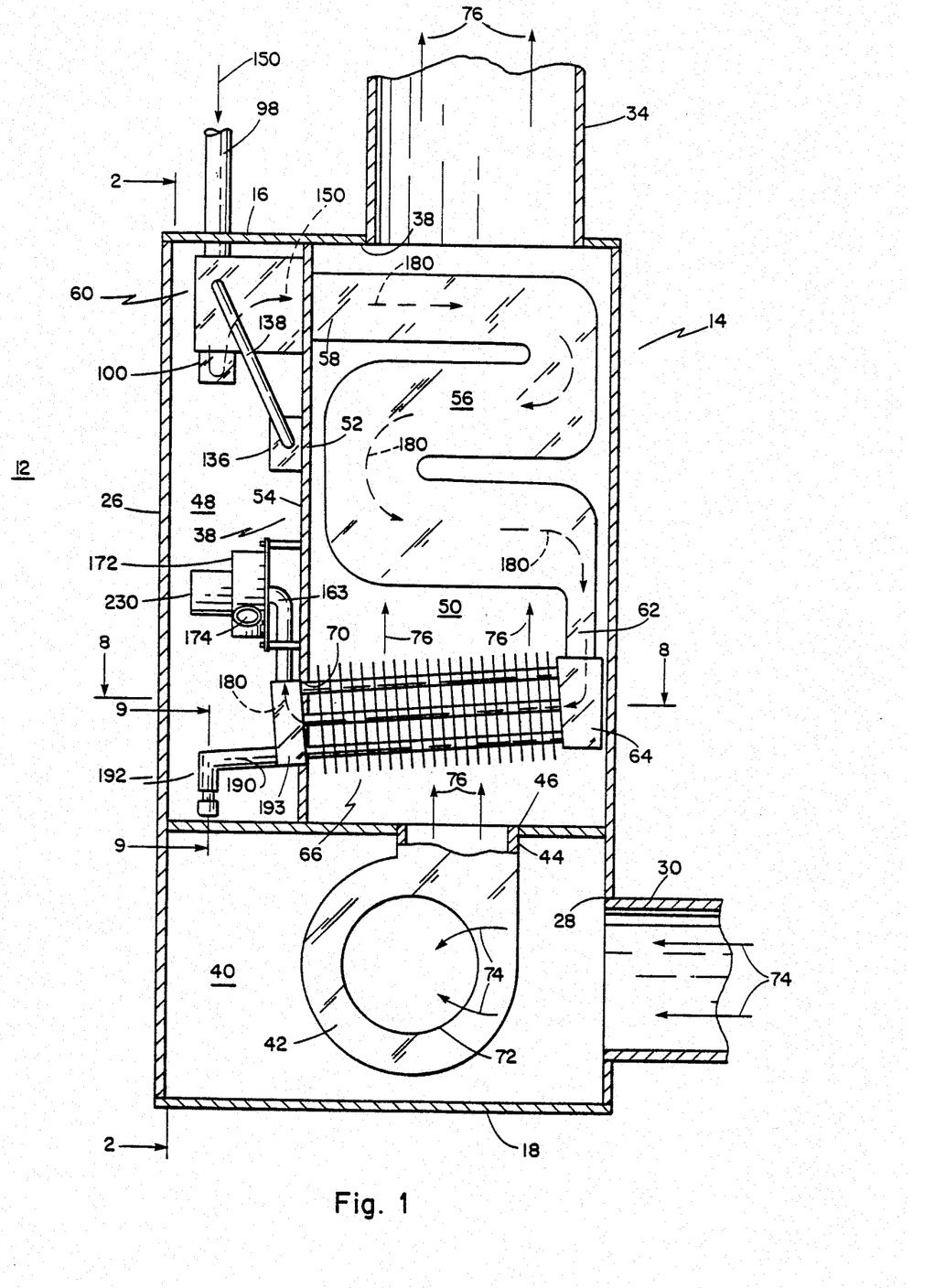
FIG. 1 is a side cross-sectional view of the improved gas-fired, condensing mode hot air furnace of the invention taken generally along the line 1—1 of FIG. 2.

Heat exchanger 56 is positioned in air passage 50 and comprises an elongated conduit 57 having a serpentine configuration with its intake end 58 abutting inner side 52 of partition 38 and communicating with gas burner enclosure 60, and with its discharge end 62 connected to inlet manifold 64 of condenser 66. The cross-sectional area of heat exchange 56 progressively increases from inlet end 58 to discharge end 62, as best seen in FIG. 1. Exhaust manifold 68 of condenser 66 extends through opening 70 in partition 38 into cavity 48.

It will now be seen that cool air is drawn into blower cavity 40 through inlet duct 30 and enters blower air intake opening 72, as shown by arrows 74 air is discharged by blower 42 and caused to flow serially over condenser 66 and heat exchanger 56, extracting heat therefrom, to hot air discharge duct 34, as shown by arrows 76 (FIG. 1).

Figure 3:
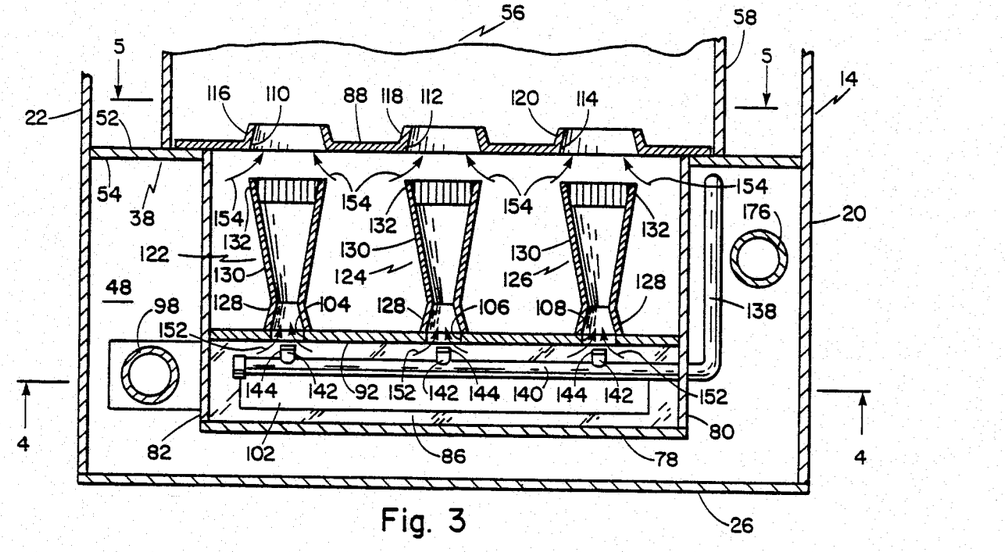
FIG. 3 is a fragmentary, top cross-sectional view taken generally along the line 3—3 of FIG. 2.
Figure 4:
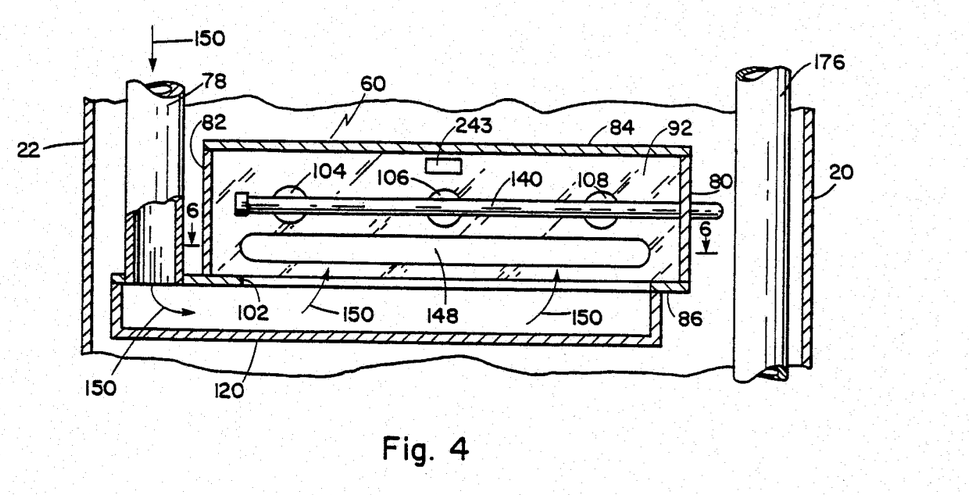
FIG. 4 is a fragmentary, front view, partly in cross section, taken generally along the line 4—4 of FIG. 3.
Figure 5:
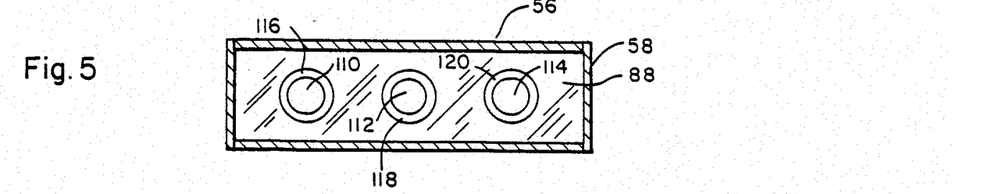
FIG. 5 is a fragmentary cross-sectional view taken generally the line 5—5 of FIG. 3.

Referring now specifically to FIGS. 3–7, sealed burner enclosure 60 is positioned in cavity 48 and comprises front wall 78, side walls 80, 82, top and bottom walls 84, 86 and rear wall 88. Side walls 80, 82 and top and bottom walls 84, 86 extend through opening 90 in partition 38 and are joined to rear wall 88 which forms an extension of partition 38 and closes opening 90. End 58 of heat exchanger 56 surrounds rear wall 88, as best seen in FIGS. 3 and 5.

Heat exchanger 56 is positioned in air passage 50 and comprises an elongated conduit 57 having a serpentine configuration with its intake end 58 abutting inner side 52 of partition 38 and communicating with gas burner enclosure 60, and with its discharge end 62 connected to inlet manifold 64 of condenser 66. The cross sectional area of heat exchange 56 progressively increases from inlet end 58 to discharge end 62, as best seen in FIG. 1.

Figure 6:
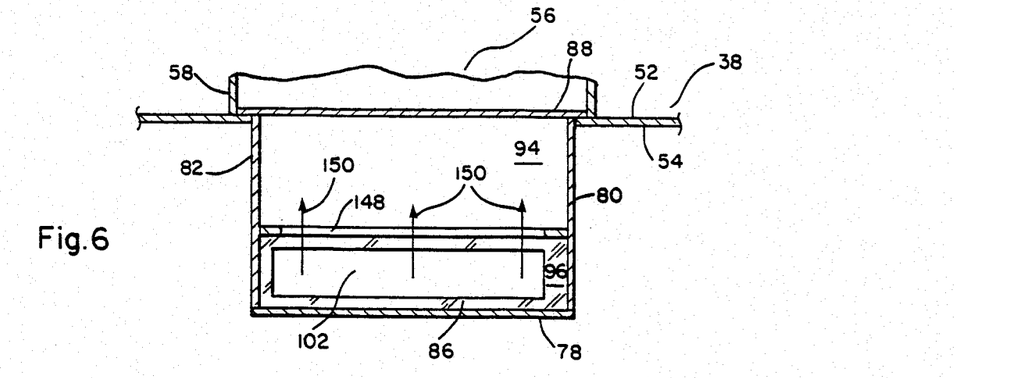
FIG. 6 is a fragmentary cross-sectional view taken generally along the line 6—6 of FIG. 4.

Enclosure 60 has partition 92 extending between side walls 80, 82, and top and bottom walls 84, 86 in spaced parallel relationship with front and rear walls 78, 88 and defining first and second cavities 94, 96 therewith, as best seen in FIGS. 3 and 6. Fresh air inlet duct 98 extends downwardly through top wall 16 of casing 14 into cavity 48 and communicates with duct 100 which in turn communicates with cavity 96 through opening 102 and bottom wall 86.

Partition 92 has three spaced openings 104, 106, 108 formed therethrough. Spaced openings 110, 112, 114 are formed in rear wall 88 respectively aligned with openings 104, 106, 108 in partition 92. Openings 110, 112, 114 respectively communicate with end 58 of heat exchanger 56 and are respectively surrounded by frusto-conical flanges 116, 118, 120 which extend into end 58 of heat exchanger 56. Venturi tubes 122, 124, 126 are positioned in cavity 94 respectively aligned with openings 104 and 110, 106 and 112, and 108, 114. Each Venturi tube 122, 124, 126 comprises a shorter frusto-conical section 128 having its larger end joined to partition 92 and surrounding the respective opening 104, 106, 108 therein, and a longer frusto-conical section 130 having its smaller end joined to the smaller end of frusto-conical section 128 and its larger end 132 spaced from rear wall 88, as best seen in FIGS. 3 and 7.

Gas supply line 134 is connected to gas line 138 by conventional solenoid gas valve 136. Gas line 138 enters cavity 94 through side wall 80 of compartment 60 and is connected to gas manifold 140. Gas manifold has short tubes 142 connected thereto to each having an orifice 144 at its end respectively aligned with openings 104, 106, 108, Venturi tubes 122, 124 and 126, and openings 110, 112, 114. Partition 92 has elongated opening 148 formed therein below openings 104, 106, 108, as best seen in FIGS. 4 and 6.

It will now be seen that fresh air enters cavity 96 through fresh air intake duct 98, duct 100, and opening 102, under the influence of purge blower 172 as will hereafter be described, as shown by arrows 150 in FIG. 4. Primary combustion air enters openings 104, 106 and 108 in partition 92 and Venturi tubes 122, 124, 126 around orifices 142, 144, 146, as shown by arrows 152 in FIGS. 3 and 7. Secondary air enters openings 110, 112 and 114 through the spaces between ends 132 of Venturi tubes 122, 124 and 126, as shown by arrows 154 in FIGS. 3 and 7.

Figures 7, 8:
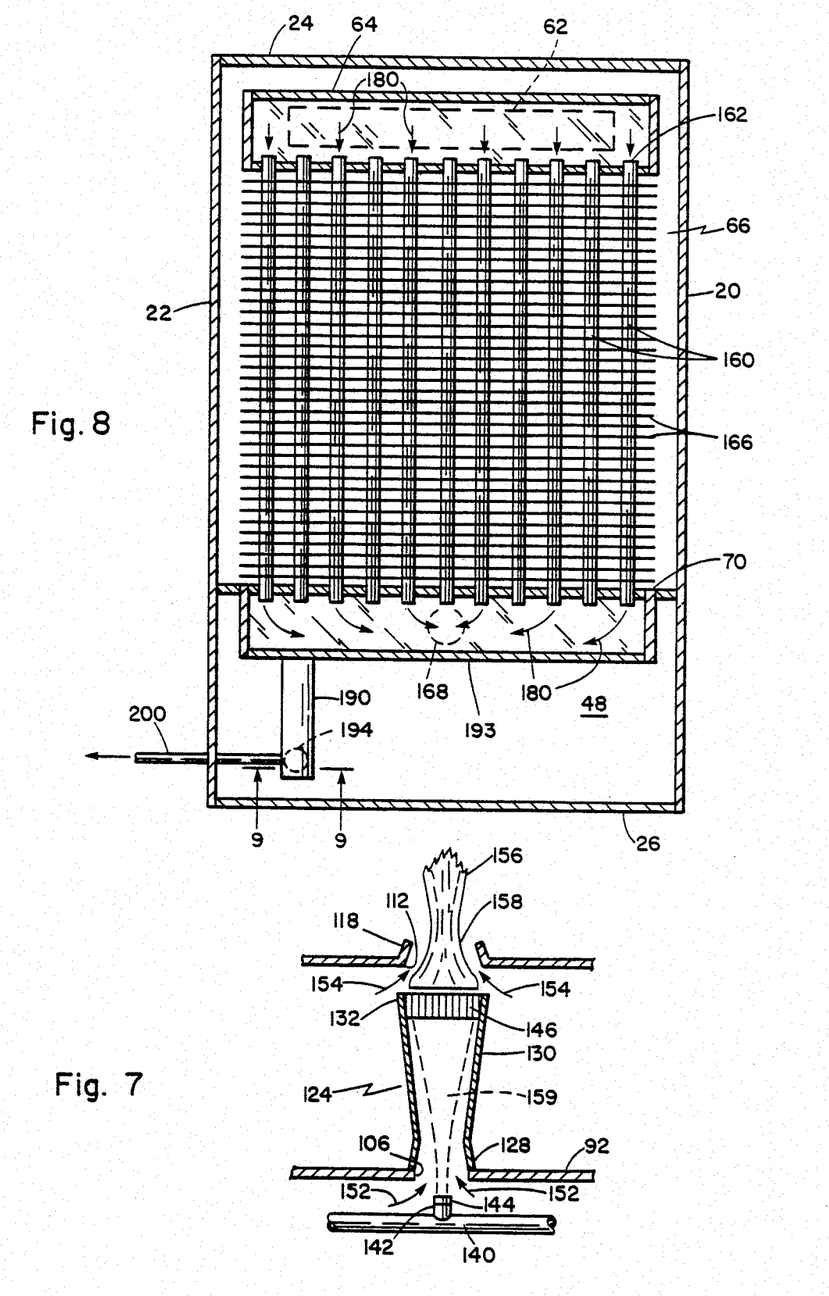
FIG. 7 is a fragmentary cross-sectional view showing one of the Venturi tubes of FIG. 3.
FIG. 8 is a fragmentary view, partly in cross-section, of the condenser, taken generally along the line 8—8 of FIG. 1.

Referring specifically to FIG. 7, Venturi tubes 122, 124 and 126 each have conventional flame retention rings or ribbons 146 at its larger end 132 to retain gas flame 158 at larger end 132 as shown. Venturi tubes 122, 124 and 126 and the spacing of ends 132 thereof from rear wall 88 together with frusto-conical flanges 118 surrounding openings 110, 112, 114 therein causes flame 156 from orifices 142, 144, 146 to be necked-down, as at 158, to inhibit impingement of the flame with the interior walls of heat exchanger 58 thereby to prevent production of carbon monoxide. The unburned gas in Venturi tubes 122, 124, 126 is shown in dashed lines at 159.

Referring now specifically to FIG. 8, heat exchanger 66 comprises a plurality of spaced, parallel, elongated, thin-wall tubes 160 respectively extending between intake manifold 64 and exhaust manifold 68 and respectively have open ends 162, 164 communicating therewith. Tube 160 respectively extend through spaced, parallel, relatively thin cooling fins 166. Discharge end 62 of heat exchanger 56 communicates with intake manifold 64.

Vent duct 168 communicates with exhaust manifold 68 through top wall 170 thereof. Purge blower 172 is coupled to vent duct 168 and has its discharge 174 coupled to exhaust flue 176 by damper-actuated switch assembly 178, all as best seen in FIG. 2.

It will now be seen that heat exchanger 56, condenser 66, vent duct 168, purge blower 172 and exhaust flue 176 form an exhaust passage for the products of combustion from gas burner orifices 142, 144 and 146. It will further be seen that purge blower 172 causes a flow of fresh air from fresh air intake duct 98 through enclosure 60, as shown by arrows 150, a flow of combustion air and the products of combustion into intake end 58 of heat exchanger 56, as shown by arrows 152, 154, and a flow of the products of combustion through heat exchanger 56, condenser 66, vent ducts 168, and exhaust flue 176, as shown by arrows 180.

As will hereafter be described in connection with FIG. 11, operation of purge blower 172 is initiated prior to actuation of gas valve 136 and ignition of burner orifices 142, 144, 146 thereby to purge gas fumes from the exhaust passage. Blower 172 remains in operation during operation of furnace 12 thereby to provide combustion air at a pressure above atmospheric pressure to burner orifices 142, 144 and 146, and to provide a positive draft through the exhaust passage.

Figures 2, 9, 10:
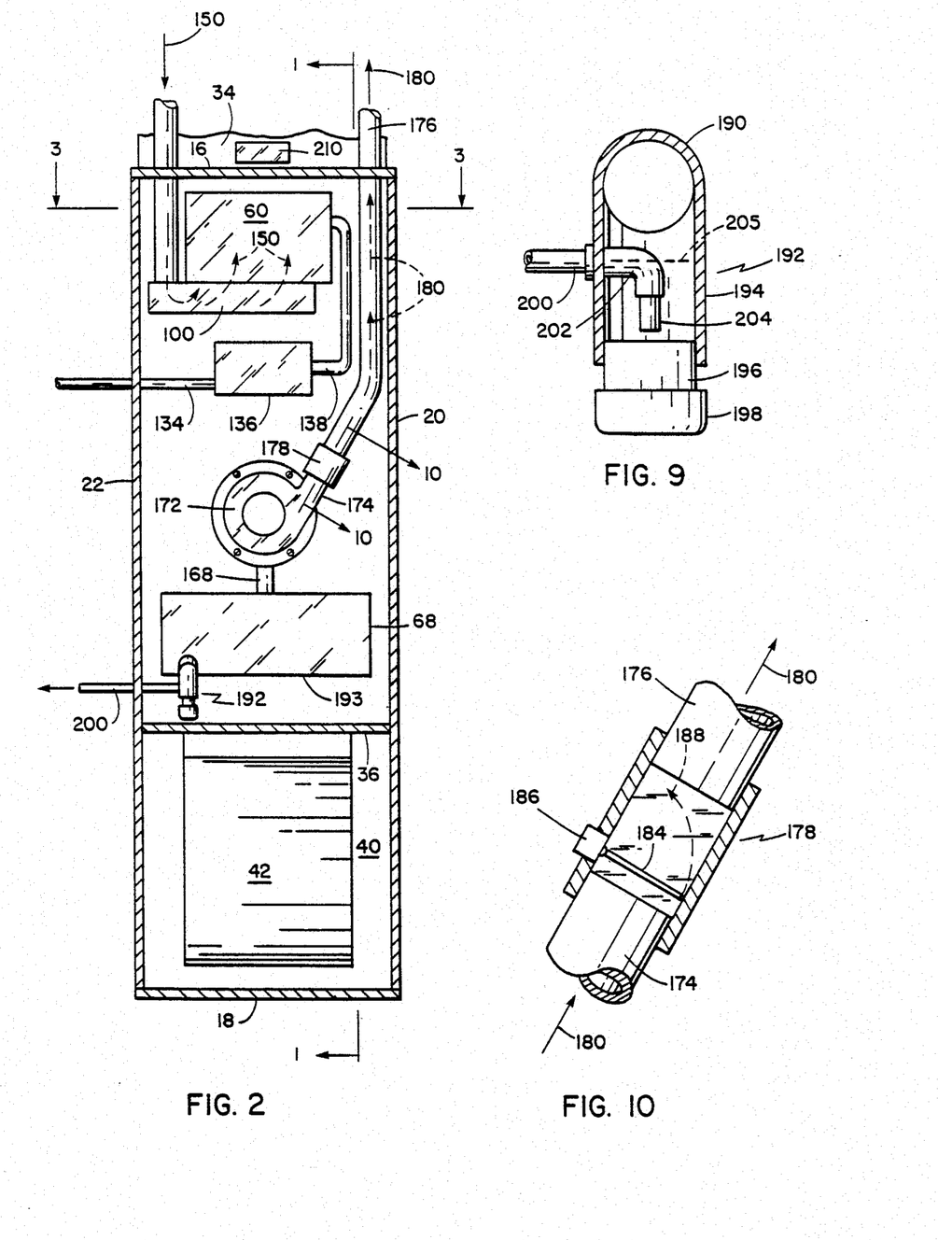
FIG. 2 is a front view taken generally along the line 2—2 of FIG. 1, showing the furnace of FIG. 1 with the front panel of the furnace enclosure removed.
FIG. 9 is a fragmentary cross-sectioned view of the condensate sump taken generally along the line 9—9 of FIG. 1.
FIG. 10 is a fragmentary cross-sectional view of the damper-actuated switch taken generally along the line 10—10 of FIG. 2.

Referring specifically to FIG. 10, damper-actuated switch assembly 178 comprises sleeve 182 joining air discharge 174 of blower 172 and exhaust flue 176.

Damper 184 is positioned within sleeve 182 and is pivotally mounted by switch 186. It will be seen that damper 184 is moved to its open position, as shown by arrow 188, thereby actuating switch 186, by flow of the products of combustion under the influence of blower 172, as shown by arrows 180.

In a specific embodiment of the invention, condenser 66 comprises twenty-one stainless steel tubes 160 each one half inch in diameter and sixteen inches long with ten aluminum fins 166 per inch. It will be seen that the cool air from furnace blower 42 flowing over and around condenser 66, as shown by arrows 76, condenses the water from the products of combustion, resulting condensate flowing through condensate drain duct 190 into sump 192.

Referring now additionally to FIG. 9, condensate drain duct 190 communicates with exhaust manifold 68 of condenser 66 adjacent bottom wall 193 thereof in order to drain condensate condensed out of the products of combustion. Sump 192 comprises conduit 194 coupled to the outer end of condensate drain duct 190 and closed at its lower end by sleeve 196 and cap 198. Condensate drain line 200 has elbow 202 connected thereto and extending through the wall of conduit 194. Drain line 200 preferably is located below condensate drain line 190, as shown. Short extension 204 of drain line 200 is connected to elbow 202 and extends downwardly, as shown. It will now be seen that when condensate drained from condenser 66 through condensate drain duct 190 rises in sump 192 to the level shown by dashed line 205, the condensate will be drained-away by drain line 200.

Figure 11:
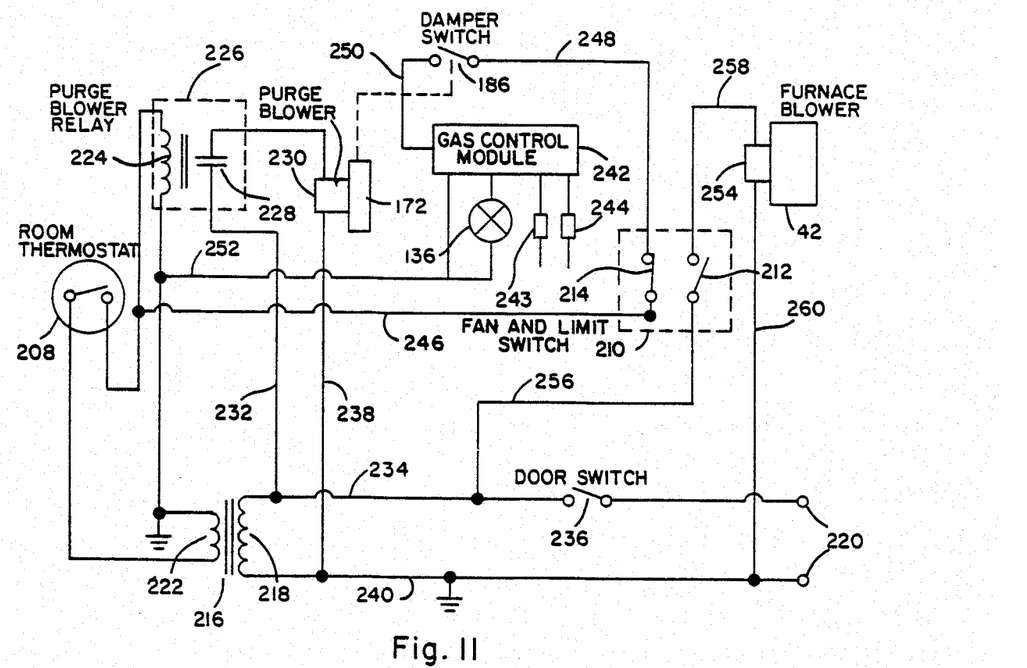
FIG. 11 is a schematic diagram showing the control system for the furnace of the invention.

Referring now to FIG. 11, there is shown control system 206 for furnace 12. Control system 206 is adapted to be connected to conventional thermostat 208 for sensing the temperature in the space to be heated. Furnace 12 includes conventional fan and limit switch 210 having thermostatically actuated fan switch 212 and thermostatically actuated limit switch 214. Fan switch 212 has its contacts closed in response to the temperature of the heated air in air passage 50 adjacent hot air discharge opening 32 rising to a predetermined level, and its contacts opened when that temperature falls below the predetermined level. Limit switch 214 has its contacts opened when the temperature in air passage 50 adjacent hot air discharge opening 32 rises above a predetermined higher level. Control system 206 comprises step-down transformer 216 having its primary winding 218 coupled across line voltage source 220 for reducing the line voltage, typically 120 volts, 60 Hertz, to a lower control voltage across its secondary winding 222, typically 24 volts.

The contacts of thermostat 208 couple secondary winding 222 of transformer 216 across operating coil 224 of purge blower relay 226 for energization thereby. Relay 226 has normally open contacts 228. Drive motor 230 of purge blower 172 is coupled by normally open contacts 228 of relay 226 and lead 232 to the "hot" side 234 of line voltage source 220. Door switch or interlock 236 which is open by removal of front panel 26 of casing 14 is coupled in series in side 234 of line voltage source 220. Purge blower motor 230 is coupled by lead 238 to grounded side 240 of line voltage source 220. Closing of the contacts of thermostat 208 also couples limit switch 214, damper or air switch 186, solid state gas control module 242. Gas valve 136 flame sensor 243 and spark ignition electrode 244 are controlled by gas control module 242, which may be a Fennal 05-16 control, across secondary winding 222 of transformer 216 by leads 246, 248, 250 and 252. Fan switch 212 couples drive motor 254 of furnace blower 42 across sides 234, 240 of line voltage source 220 by leads 256, 258 and 260.

In operation, when the contacts of thermostat 208 close thus calling for heat, operating coil 224 of purge blower relay 226 is energized thus closing its contacts 228 energizing purge blower motor 230 thereby to initiate operation of purge blower 172 to prepurge any unburned gases in heat exchanger 56 and condenser 66. A predetermined air flow through purge blower discharge 174 and exhaust flue 176 opens damper or air switch 184 sufficiently to close switch contacts 186 thereby energizing control 242 through normally closed limit switch 214 to open gas valve 136 and to energize spark ignition electrode 244. Assuming that satisfactory ignition has been obtained and thus that flame detector 242 is not latched-open contacts 228, when a predetermined temperature is reached in air passage 50 adjacent hot air discharge opening 32, fan switch 212 closes thus energizing furnace blower motor 254 through leads 256, 258 and 260. It will be observed that purge blower motor 230 remains energized to operate purge blower 172 during operation of the furnace through contacts 228 of relay 226 which is energized while the contacts of thermostat 208 are closed.

When thermostat 208 is satisfied thus opening its contacts, operating coil 224 of relay 226 is deenergized thus opening its contacts 228 and deenergizing purge blower motor 230 to terminate operation of purge blower 172. Termination of the flow of air through damper-actuated switch assembley 178 deenergizes control 242 to energize gas valve 136 and spark ignition electrode 244. When the temperature in air passage 50 adjacent hot air discharge opening 32 falls to the predetermined level, fan switch contacts 212 open thereby deenergizing furnace blower motor 254. Limit switch contacts 214 of fan and limit switch 210 open at a predetermined high temperature to protect against excessive temperature in air passage 50 adjacent hot air discharge opening 32.

It will now be seen that the invention provides an improved, highly efficient gas-fired, condensing mode hot air furnace which, by reason of the very low stack temperatures provided, permits use of a small, low temperature flue and thus elimination of the usual, costly high temperature flue pipes and chimneys with the intended risk of fire. Because of the low stack temperatures provided by the improved furnace of the invention, which may be less than 100° F., vent duct 168, sleeve 178 and exhaust flue 176 may be formed of PVC.

While there have been described above the principles of this invention in connection with specific apparatus, it is to be clearly understood that this description is made only by way of example and not as a limitation to the scope of the invention.

What is claimed is:

1. In a hot air furnace including means for burning fluid fuel, exhaust passage means for carrying the products of combustion from the burner means to an exhaust flue, heat exchanger means in the exhaust passage means for extracting heat from the products of combustion therein, air passage means for carrying a flow of air over the heat exchanger means to be heated thereby, and air moving means for causing a flow of air through the air passage means, the improvement comprising: means communicating with said exhaust passage means for enclosing said burner means, said burner means firing into said exhaust passage means; a fresh air duct communicating with said enclosing means for admitting combustion air thereto; condenser means in said exhaust passage means for removing water from the products of combustion therein, said condenser means being exposed to said air passage means; and second air moving means in said exhaust passage means for causing fluid flow therein from said fresh air inlet duct through said enclosing means and said exhaust passage means to said exhaust flue.

2. The furnace of claim 1 wherein said fuel burning means fires directly into said heat exchanger means.

3. The furnace of claim 2 wherein said heat exchanger means has first and second opposite ends, said enclosing means communicating with and said fuel burning means firing directly into said first end of said heat exchanger means, said condenser means having first and second opposite ends with said first end thereof being coupled to said second end of said heat exchanger means, said second air moving means being coupled to said second end of said condenser means.

4. The furnace of claim 3 wherein said heat exchanger means comprises an elongated conduit having an undulating configuration between said ends thereof.

5. The furnace of claim 3 wherein said first-named air moving means causes air flow from a cool air intake serially over said condenser means and heat exchanger means to a hot air discharge.

6. The furnace of claim 3 wherein said air passage means is defined by side walls respectively having interior and exterior sides, one of said side walls having first and second spaced openings therethrough, said first end of said heat exchanger means communicating with said first opening on said interior side of said side wall, said enclosing means communicating with said first opening on said exterior side of said one side wall, said fuel burning means firing through said first opening, said second end of said condenser means including a portion extending through said second opening, said second air moving means being disposed on said exterior side of said one side wall.

7. The furnace of claim 6 wherein said air passage means is also defined by opposite end walls respectively having cool air intake and hot air discharge openings therein, said first-named air moving means communicating with said cool air intake opening and causing air flow serially over said condenser means and heat exchanger means to said hot air discharge opening, said condenser means being adjacent said cool air intake opening and said heat exchanger means being adjacent said hot air discharge opening.

8. The furnace of claim 7 wherein said heat exchanger means comprises an elongated conduit having a serpentine configuration between said ends thereof and having a progressively larger cross-section from said first end to said second end thereof.

9. The furnace of claim 8 wherein said first and second ends of said condenser means respectively comprise inlet and exhaust manifolds, said condenser means comprising a plurality of thin-walled tubes extending in parallel between and communicating with said manifolds and respectively extending through cooling fins.

10. The furnace of claim 9 further comprising means for draining condensate from said exhaust manifold.

11. The furnace of claim 10 wherein said exhaust manifold has a portion extending through said second opening, said second air moving means communicating with said exhaust manifold portion at a first location, said condensate draining means comprising a drain duct communicating with exhaust manifold at a second location, a sump communicating with said drain duct and a drain line connected to said sump at a level below said drain duct.

12. The furnace of claim 11 wherein said air passage means is defined by side walls respectively having interior and exterior sides, one of said side walls having an opening therethrough, said heat exchanger means comprising a conduit having inlet and exhaust openings therein, said inlet opening of said conduit communicating with said opening in said one side wall on said interior side thereof, said exhaust opening of said chamber communicating with said condenser means, said enclosing means comprising a sealed enclosure having walls defining a cavity, said exterior side of said one side wall of said air passage means forming one of said enclosure walls with said opening therein communicating with said cavity, said fresh air duct communicating with said cavity through another wall of said enclosure, said gas line extending into said cavity through a wall of said enclosure with said orifice disposed in said cavity to direct flame through said opening in said one side wall into said inlet opening of said chamber.

13. The furnace of claim 12 further comprising Venturi means in said cavity for shaping the flame from said orifice to inhibit impingement thereof with the wall of said heat exchanging means conduit.

14. The furnace of claim 13 wherein said Venturi means comprises a partition extending across said cavity parallel with said one side wall of said air passage means and spaced therefrom, said partition having an opening therein aligned with said opening in said one side wall, said orifice being aligned with said openings and being disposed on the side of said partition remote from said one side wall, and a Venturi tube having a first frusto-conical section with relatively larger and smaller ends, and a second frusto-conical section longer than said first section and having relatively larger and smaller ends with its smaller end joined to the smaller end of said first section, said Venturi tube being disposed between said partition and said one side wall and being aligned with said openings in said partition and one side wall, the larger end of said first section abutting said partition and surrounding said opening therein, said orifice being at the end of a tube joined to said gas line and having a cross-sectional area smaller than that of said opening in said partition thereof permitting entry of primary air around said conduit into said Venturi tube, the larger end of said second section of said Venturi tube being spaced from said exterior side of said one side wall thereby permitting passage of secondary air through said opening in said one side wall, said one side wall having a frusto-conical flange on said interior side thereof surrounding said opening therein with its smaller end extending into said inlet opening of said heat exchanging means chamber.

15. The furnace of claim 14 wherein said partition divides said cavity into first and second sections, said Venturi tube being in said first cavity section, said fresh air duct communicating with said second cavity section, said partition having a second opening therethrough for admitting secondary air to said first cavity section, said gas line and tube being disposed in said second cavity section, said larger end of said second Venturi tube section having flame retention rings therein.

16. The furnace of claim 15 wherein there are a plurality of said first-named openings in said partition and a corresponding plurality of said tubes and orifices, said Venturi tubes and said openings in said one side wall.

17. The furnace of claim 1 wherein said fuel burning means is gas-fired and includes a gas feed line having at least one orifice coupled thereto disposed to direct flame into said heat exchanger means.

18. The furnace of claim 1 wherein said first-named air moving means is a first motor-driven blower and said second air moving means is a second motor-driven blower, and further comprising control means responsive to the temperature in the space to be heated for controlling said fuel burning means and said blowers, said control means including means for initiating operation of said fuel burning means following initiation of operation of said first blower thereby to purge fuel fumes from said exhaust passage means and to maintain a draft therethrough during operation of said fuel burning means.

19. The furnace of claim 18 wherein said initiating means includes a damper in said exhaust flue movable to an open position in response to fluid flow therein, and switch means actuated in response to movement of said damper to said open position thereof for energizing said control means.

20. The furnace of claim 1 wherein said enclosing means is sealed against admission of surrounding atmospheric air.

* * * * *